US010254405B2

(12) United States Patent
Campbell et al.

(10) Patent No.: US 10,254,405 B2
(45) Date of Patent: Apr. 9, 2019

(54) HYPERFINE INTERPOLATED RANGE FINDING FOR CW LIDAR, RADAR, AND SONAR USING REPEATING WAVEFORMS AND FOURIER TRANSFORM REORDERING

(71) Applicant: The United States of America as represented by the Administrator of the National Aeronautics and Space Administration, Washington, DC (US)

(72) Inventors: Joel F. Campbell, Poquoson, VA (US); Bing Lin, Yorktown, VA (US); Amin R. Nehrir, Yorktown, VA (US)

(73) Assignee: THE UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 310 days.

(21) Appl. No.: 14/817,805

(22) Filed: Aug. 4, 2015

(65) Prior Publication Data
US 2016/0047891 A1    Feb. 18, 2016

Related U.S. Application Data

(60) Provisional application No. 62/037,662, filed on Aug. 15, 2014, provisional application No. 62/064,492, filed on Oct. 16, 2014.

(51) Int. Cl.
*G01S 7/35* (2006.01)
*G01S 17/32* (2006.01)
(Continued)

(52) U.S. Cl.
CPC .............. *G01S 17/32* (2013.01); *G01S 7/352* (2013.01); *G01S 7/4865* (2013.01);
(Continued)

(58) Field of Classification Search
CPC ........ G01S 17/32; G01S 7/352; G01S 7/4865; G01S 7/4915; G01S 7/534; G01S 2007/356
See application file for complete search history.

(56) References Cited

U.S. PATENT DOCUMENTS 4,901,082 A * 2/1990 Schreiber .................. G01S 7/28
                                                         342/162
5,177,691 A * 1/1993 Welles ..................... G01P 5/241
                                                          702/77
(Continued)

OTHER PUBLICATIONS

National Research Council, "Earth Science and Applications from Space: National Imperatives for the Next Decade and Beyond," The National Academies Press, 2007, pp. 1-16, 27-60, 79-140, 152-216 and 423-428, Washington, D.C.
(Continued)

*Primary Examiner* — Bryan Bui
(74) *Attorney, Agent, or Firm* — Jonathan B. Soike; Andrea Z. Warmbier; Mark P. Dvorscak

(57) ABSTRACT

Systems, methods, and devices may enhance the apparent sample rate of data collected using Nyquist sampling from a system, such as Continuous Wave (CW) Light detection and ranging ("Lidar"), Radio detection and ranging ("Radar"), or Sound Navigation and Ranging ("Sonar"), that has been modulated with a repeating waveform, such as linear swept frequency, by reordering of the data in the frequency domain. The enhancement of the apparent sample rate may result in a highly interpolated range profile where the data resolution may be enhanced by a factor equal to the number of repeats in the signal being processed, and may result in a highly detained range measurement with a high precision. The various embodiments may combine data from multiple modulation repeats into a single highly interpolated pulse,
(Continued)

which may result in a real-time finer range measurement from CW Lidar, Radar, or Sonar systems.

19 Claims, 15 Drawing Sheets

(51) Int. Cl.
G01S 7/486 (2006.01)
G01S 7/491 (2006.01)
G01S 7/534 (2006.01)

(52) U.S. Cl.
CPC ............ *G01S 7/4915* (2013.01); *G01S 7/534* (2013.01); *G01S 2007/356* (2013.01)

(56) References Cited

U.S. PATENT DOCUMENTS

| | | | |
|---|---|---|---|
| 6,157,341 A | 12/2000 | Silvestrin et al. | |
| 6,967,607 B2 | 11/2005 | Melanson | |
| 7,289,049 B1 * | 10/2007 | Fudge ................. | H03M 1/1245 341/123 |
| 7,359,057 B2 | 4/2008 | Schwiesow | |
| 7,361,922 B2 | 4/2008 | Kameyama et al. | |
| 7,616,888 B2 | 11/2009 | Mendenhall et al. | |
| 7,995,917 B2 | 8/2011 | Mendenhall et al. | |
| 8,605,262 B2 | 12/2013 | Campbell et al. | |
| 2007/0008534 A1 | 1/2007 | Lo et al. | |
| 2009/0153394 A1 | 6/2009 | Navarro et al. | |
| 2010/0208231 A1 | 8/2010 | Murai | |
| 2011/0129023 A1 * | 6/2011 | Hoffmann ........... | H04L 27/2613 375/260 |
| 2013/0342836 A1 * | 12/2013 | Newbury ................ | G01J 3/453 356/326 |

OTHER PUBLICATIONS

Koch, Grady J. et al., "Coherent Differential Absorption Lidar Measurements of CO2," Applied Optics, Sep. 10, 2004, pp. 5092-5099, vol. 43, No. 26.
Abshire, James B. et al., "Pulsed Airborne Lidar Measurements of Atmospheric CO2 Column Absorption," 8th International Carbon Dioxide Conference, ICDC8, Sep. 13-19, 2009, pp. 770-783, vol. 62, Tellus, B. Germany.
Kameyama, Shumpei et al., "Feasibility Study on 1.6 um Continuous-wave Modulation Laser Absorption Spectrometer System for Measurement of global CO2 Concentration from a Satellite," Applied Optics, May 10, 2011, pp. 2055-2068, vol. 50, No. 14.
Campbell, Joel F. et al., "Pseudorandom Noise Code-based Technique for Thin-cloud Discrimination with CO2 and O2 absoprtion Measurements," Optical Engineering, Dec. 2011, pp. 126002-1-126002-6, vol. 50, No. 12.
Campbell, Joel F. et al., "A Low Cost Remote Sensing System Using PC and Stereo Equipment," Am. J. Phys., Dec. 2011, pp. 1240-1245, vol. 79, No. 12.
Agishev, R. et al., "Atmospheric CW-FM-LD-RR Ladar for Trace-constituent Detection: A Concept Development," Appl. Phy. B, 2005, pp. 695-703, vol. 81.
Batet, Oscar et al., "Intensity-modulated Linear-frequency-modulated Continuous-wave Lidar for Distributed Media: Fundementals of Technique," Applied Optics, Jun. 10, 2010, pp. 3369-3379, vol. 49, No. 17.
Imaki, Masaharu et al., "Laser Absorption Spectrometer Using Frequency Chirped Intesity Modulation at 1.57 um Wavelength for CO2 Measurement," Optics Letters, Jul. 1, 2012, pp. 2688-2690, vol. 37, No. 13.
Browell, Edward V. et al., "Airborne Laser CO2 Column Measurements: Evaluation of Precision and Accuracy Under Wide Range of Conditions", Presented at Fall AGU Meeting, Dec. 5-9, 2011, pp. 1-17, San Francisco, CA.

Browell, Edward V. et al., "Airborne Validation of Laser CO2 and O2 Column Measurements," 16th Symposium on Meteorological Observation and Instrumentation, 92nd AMS Annual Meeting, Jan. 22-26, 2012, New Orleans, LA.
Dobler, Jeremy T. et al., "Atmospheric CO2 Column Measurements with an Airborne Intensity-modulated Continuous Wave 1.57 um Fiber Laser Lidar," Applied Optics, Apr. 20, 2013, pp. 2874-2892, vol. 52, No. 12.
Songsheng, Chen, et al., "Digital Lock-in Detection for Multiple-frequency Intensity-modulated Continuous Wave Lidar," Jun. 25-29, 2012, 26th International Laser Radar Conference, SIP-38, Port Heli, Greece.
Dobbs, Michael et al., "Matched Filter Enhanced Fiber-based Lidar for Earth,Weather and Exploration", NASA ESTO Conference, Jun. 2006, pp. 1-6.
Dobbs, Michael et al., "A Modulated CW Fiber Laser-Lidar Suite for the ASCENDS Mission," Proc. 24th International Laser Radar Conference, Jul. 24-29, 2008, Boulder, CO.
Dobler, Jeremy T. et al., "Advancements in a Multifunctional Fiber Laser Lidar for Measuring Atmospheric CO2 and O2," 16th Symposium on Meteorological Observation and Instrumentation, 92nd AMS Annual Meeting, Jan. 22-26, 2012, New Orleans, LA. (Abstract Submitted Herewith).
Campbell, Joel F., "Nonlinear Swept Frequency Technique for CO2 Measurements Using a CW Laser System," Applied Optics, May 1, 2013, pp. 3100-3107, vol. 52, No. 13.
Campbell, Joel, "Synthetic Quadrature Phase Detector/demodulator for Fourier Transform Spectrometers," Applied Optics, Dec. 20, 2008, pp. 6889-6894, vol. 47, No. 36.
Skinner, B. J. et al., "Matched FSK/PSK Radar," IEEE Proceedings, 1994 National Radar Conference, Mar. 1994, pp. 251-255, Atlanta, GA.
Freeman, J. et al., "Gain Modulation Response of Erbium-Doped Fiber Amplidiers," IEEE Photonics Technology Letters, Feb. 1993, pp. 224-226, vol. 5, No. 2.
Murota, Kazuaki et al., "GMSK Modulation for Digital Mobile Radio Telephony," IEEE Transactions on Communications, Jul. 1981, pp. 1044-1050, vol. 29, No. 7.
Whittaker, E.T. et al., "A Course of Modern Analysis" 1965, p. 462, Cambridge University Press, 4th Edition, Cambridge, UK.
Campbell, Joel, "The SMM Model as a Boundary Value Problem Using the Discrete Diffusion Equation," Theor. Popul. Biol., 2007, pp. 539-546, vol. 72, Issue 4.
Campbell, Joel, "Ground State Energy for the Hartree-Fock Equations with Direchiet Boundary Conditions," J. Math. Phys., Apr. 1994, pp. 1471-1486, vol. 35, No. 4.
Benedetto, John J. et al., "Sampling Multipliers and the Poisson Summation Formula," J. Fourier Anal. Appl. Nov. 5, 1997, pp. 505-523, vol. 3, No. 5.
Kameyama, Shupei et al., "Performance Improvement and Analysis of a 1.6 um Continous-wave modulation Laser Absorption Spectrometer System for CO2 Sensing," Applied Optics, Apr. 10, 2011, pp. 1560-1569, vol. 50, No. 11.
Kameyama, Shupei, et al., "Development of 1.6 um Continuous-wave Modulation Hard-target Differential Absorption Lida System for CO2 Sensing" Optics Letters, May 15, 2009, pp. 1513-1515, vol. 34, No. 10.
Takeuchi, N. et al., "Random Modulation CW Lidar," Applied Optics, May 1, 1983, pp. 1382-1386, vol. 22, No. 9.
Rybaltowski. Adam et al., "Signal-to-noise Ratio in Direct-detection Mid-infrared Random-Modulation Continuous-Wave Lidar in the Presence of Colored Additive Noise," Optics Express, Oct. 8, 2001, pp. 386-399, vol. 9, No. 8.
Rybaltowski, Adam et al., "New Modulation Sequence for Random-Modulation Continuous-Wave Lidar," Proceedings of SPIE, 2002, pp. 216-223, vol. 4484.
Rybaltowski, Adam et al., "Figure of Merit and Fundamental Range Limitations in Surface Sensing Direct-detection Mid-infrared Random-Modulation Continuous-Wave Lidar," Proceedings of SPIE, 2002, pp. 32-36, vol. 4546.
Rybaltowski, Adam et al., "Superior Signal-to-noise Ratio of a New AA1 Sequence for Random-modulation Continuous-wave Lidar," Optics Letters. Aug. 1, 2004, pp. 1709-1711, vol. 29, No. 15.

(56) References Cited

OTHER PUBLICATIONS

Takeuchi, Nobuo et al., "Diode-laser Random-modulation CW Lidar," Applied Optics, Jan. 1, 1986, pp. 63-67, vol. 25, No. 1.
Zahradnik, Pavel et al., "Analytical Design of 2-D Narrow Bandstop FIR Filters," Computational Science—ICCS 2004, 2004, pp. 56-63, vol. 3039.
Orfandis, Sophocles, "Lecture Notes on Elliptic Filter Design," Rutgers University, Nov. 20, 2005, pp. 1-42.
Chouikha, A., "On properties of elliptic Jacobi functions and applications," Journal of Nonlinear Mathematical Physics, 2005, pp. 162-169, vol. 12, No. 2.
Campbell, Joel et al., "Advanced sine wave modulation of continuous wave laser system for atmospheric CO2 differential absorption measurements," Applied Optics, 2014, pp. 816-829, vol. 53, No. 5.
WolframMathWorfd, "Jacobi Elliptic Functions," http://mathworld.wolfram.com/JacobiEllipticFunctions.html, Jun. 1, 2015, Accessed Jan. 26, 2016.
WolframResearch. "Introduction to the incomplete elliptic integrals." http://functions.wolfram.com/EllipticIntegrals/EllipticE2/introductions/IncompleteEllipticIntegrals/ShowAll.html, Jun. 1, 2015, Accessed Jan. 26, 2016.
Snape, Jamie, "Applications of Elliptic Functions in Classical and Algebraic Geometry," Dissertation, University of Durham, Durham, UK, 2004 (available at https://wwwx.cs.unc.edu/~snape/publications/mmath/dissertation.pdf).
Lin, Bing, et al., "Modeling of intensity-modulated continuous-wave laser absorption spectrometer systems for atmospheric CO2 column measurements," Applied Optics, 2013, pp. 7062-7077, vol. 52, No. 29.
Campbell, J. et al. "Pseudorandom noise code-based technique for thin-cloud discrimination with CO2 and O2 absorption measurements," Optical Engineering, Nov. 18, 2011, pp. 126002-126002, vol. 50, No. 12.
Space Studies Board. "Earth Science and Applications from Space: National Imperatives for the Next Decade and Beyond, Blending Earth Observations and Models—The Successful Paradigm of Weather Forcasting" Meas. Sci. Technol., 2000, pp. 392-397, No. 11, National Academies Press, UK.
Pougatchev, N., et al., "Advanced technologies high resolution Fourier transform spectrometer for atmospheric studies," Aerospace Conference Proceedings (IEEE), 2000, pp. 237-243, vol. 3.
Campbell, J., et al., "Binary Phase Shift Keying on Orthogonal Carriers for Multi-Channel CO2 Absoption Measurements in the Presence of Thin Clouds," Applied Optics, Oct. 15, 2014, pp. A1634-A1640, vol. 22, No. 106.
Obland, M., et al., "Technology advancement for the ASCENDS mission using the ASCENDS CarbonHawk Experiment Simulator (ACES)", 2013 AGU Fall Meeting, San Francisco, CA, Dec. 9-13, 2013. (Abstract Submitted Herewith).
Nohorai, Arye, et al., "Adaptive comb filtering for harmonic signal enhancement", Acoustics, Speech and Signal Processing, IEEE Transactions on. 1986, pp. 1124-1138, vol. 34, No. 5.
Campbell, J., et al., "High Resolution CW Lidar Altimetry using Repeating Intensity Modulated Waveforms and Fourier Transform Reordering," Optics Letters, 2014, pp. 6078-6081, vol. 39, No. 20.
Lucy, L.B., "An iterative technique for the rectification of observed distribution," The Astronomical Journal, Jun. 1974, pp. 745-754, vol. 79, No. 6.
National Research Council, "Earth Science and Applications from Space National Imperatives for the Next Decade and Beyond," The National Academies Press, 2007, pp. 1-88 Washington, D.C.

\* cited by examiner

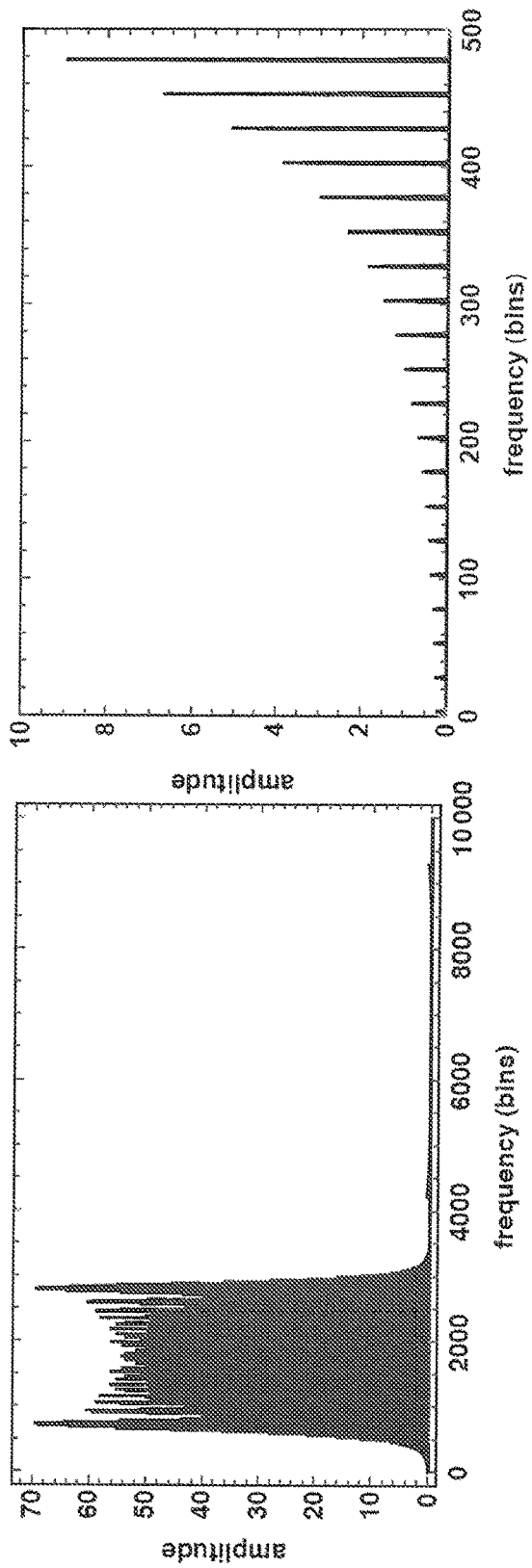

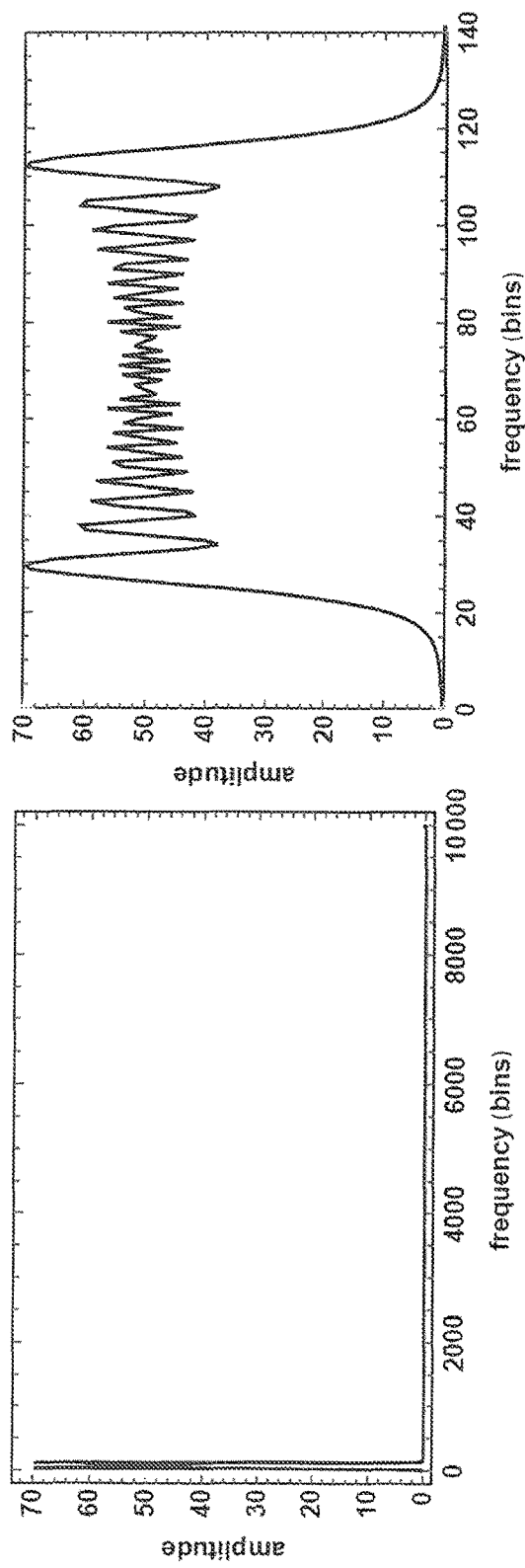

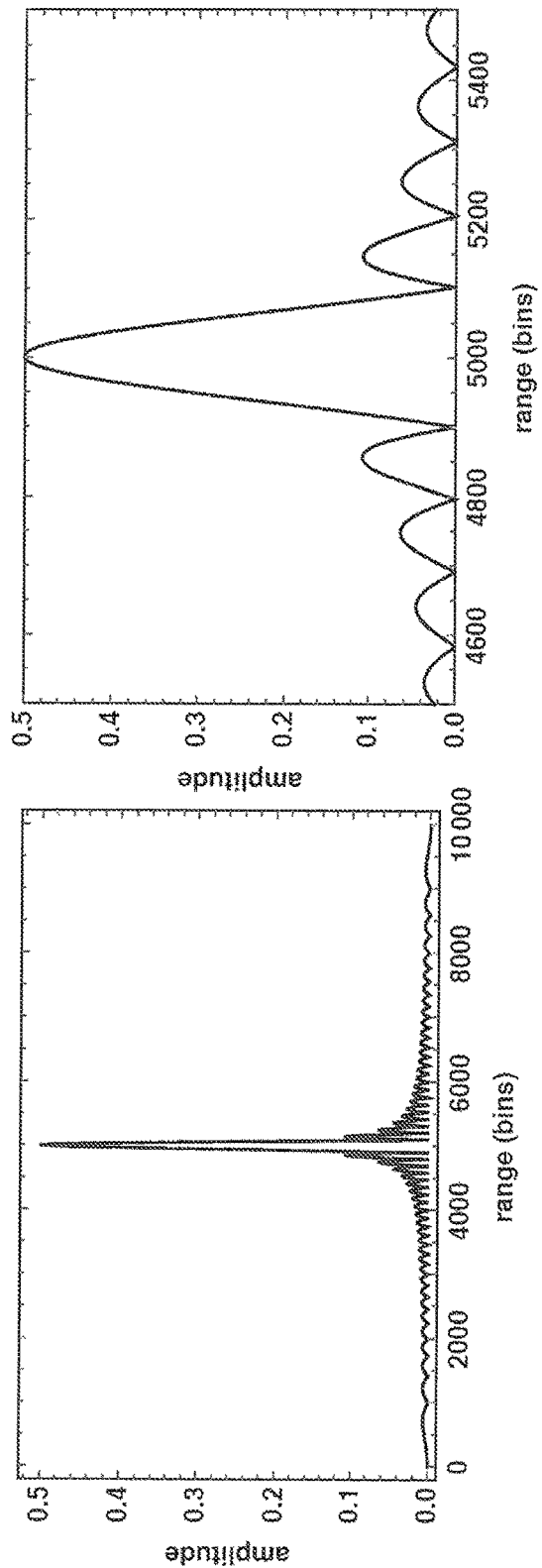

HYPERFINE INTERPOLATED RANGE FINDING FOR CW LIDAR, RADAR, AND SONAR USING REPEATING WAVEFORMS AND FOURIER TRANSFORM REORDERING

CROSS-REFERENCE TO RELATED PATENT APPLICATIONS

This patent application claims the benefit of and priority to U.S. Provisional Patent Application No. 62/037,662, filed on Aug. 15, 2014, and U.S. Provisional Patent Application No. 62/064,492, filed on Oct. 16, 2014. The entire contents of the foregoing are hereby incorporated by reference in their entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Continuous Wave ("CW") Light detection and ranging ("Lidar") is a sensing technology using light waves to determine a distance to objects. Radio detection and ranging ("Radar") is a sensing technology using radio waves to determine a distance to objects. Sound Navigation and Ranging ("Sonar") is a sensing technology using sound waves to determine a distance to objects. In CW Lidar, Radar, or Sonar systems, a wide band signal (e.g., light, radio, or sound waves, respectively), may be transmitted toward an object and the signal reflecting off that object may be received by the CW Lidar, Radar, or Sonar system. The received signal may be correlated with the digitized received signal and converted into a pulse through a mathematical transformation. One method for determining the correlation is described in Equation 1:

$$R(ref, data) = \frac{1}{N}\sum_{m=0}^{N-1} ref^*(m) data(m+n) = DFT^{-1}(DFT^*(ref^*)DFT(data)) \quad (1)$$

In Equation 1, "*" denotes the complex conjugate, N is the number of modulation repeats, ref is the reference signal and data is the digitized received signal from the receiver of the CW Lidar, Radar, or Sonar system. Typically, the complex quadrature from may be used for the reference and this would consist of the repeating wideband signal, such as linear swept frequency or some other signal. The position of the peak of this pulse may determine how far away the object is and the precision of the measurement depends on the sample rate.

Limitations in the hardware of the some conventional CW Lidar, Radar, or Sonar systems may limit the sampling rate, and therefore the data resolution may also be limited. For example, hardware limitations may limit the sample rate such that only a 75 meter data resolution may be achieved. However, 3 meters of data resolution may be needed for certain measurements, such as atmospheric $CO_2$ column measurements with a CW Lidar. Various current types of interpolation can be applied to the data from conventional CW Lidar, Radar, or Sonar systems, but current types of interpolation can take too long and can require too many resources to be implemented in a real time application. What is needed is a viable method for providing high-speed interpolated fine resolution range measurements.

BRIEF SUMMARY OF THE INVENTION

The systems, methods, and devices of the present invention may enhance the apparent sample rate of data collected using Nyquist sampling from a system, such as Continuous Wave (CW) Light detection and ranging ("Lidar"), Radio detection and ranging ("Radar"), or Sound Navigation and Ranging ("Sonar"), that has been modulated with a repeating waveform, such as linear swept frequency, by reordering of the data in the frequency domain. The enhancement of the apparent sample rate may result in a highly interpolated range profile where the data resolution may be enhanced by a factor equal to the number of repeats in the signal being processed, and may result in a highly detained range measurement with a high precision. The various embodiments may combine data from multiple modulation repeats into a single highly interpolated pulse, which may result in a real-time finer range measurement from CW Lidar, Radar, or Sonar systems.

In a further embodiment, the resolution of the CW Lidar, Radar, or Sonar systems may be further enhanced by applying a deconvolution algorithm, such as maximum entropy, Richardson-Lucy, etc., to the interpolated data.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 3A and 3B are graphs of a frequency spectrum of a correlation before reordering showing spectrum formed as a comb.

FIGS. 4A and 4B are graphs of the frequency spectrum of FIGS. 3A and 3B after reordering with comb tooth spacing reordered to zero.

FIGS. 6A and 6B are graphs of a correlation of the frequency spectrum of FIGS. 4A and 4B after reordering showing s periodic pulse converted into a single pulse that is oversampled by the number of repeats.

DETAILED DESCRIPTION OF THE INVENTION

Figure 1:
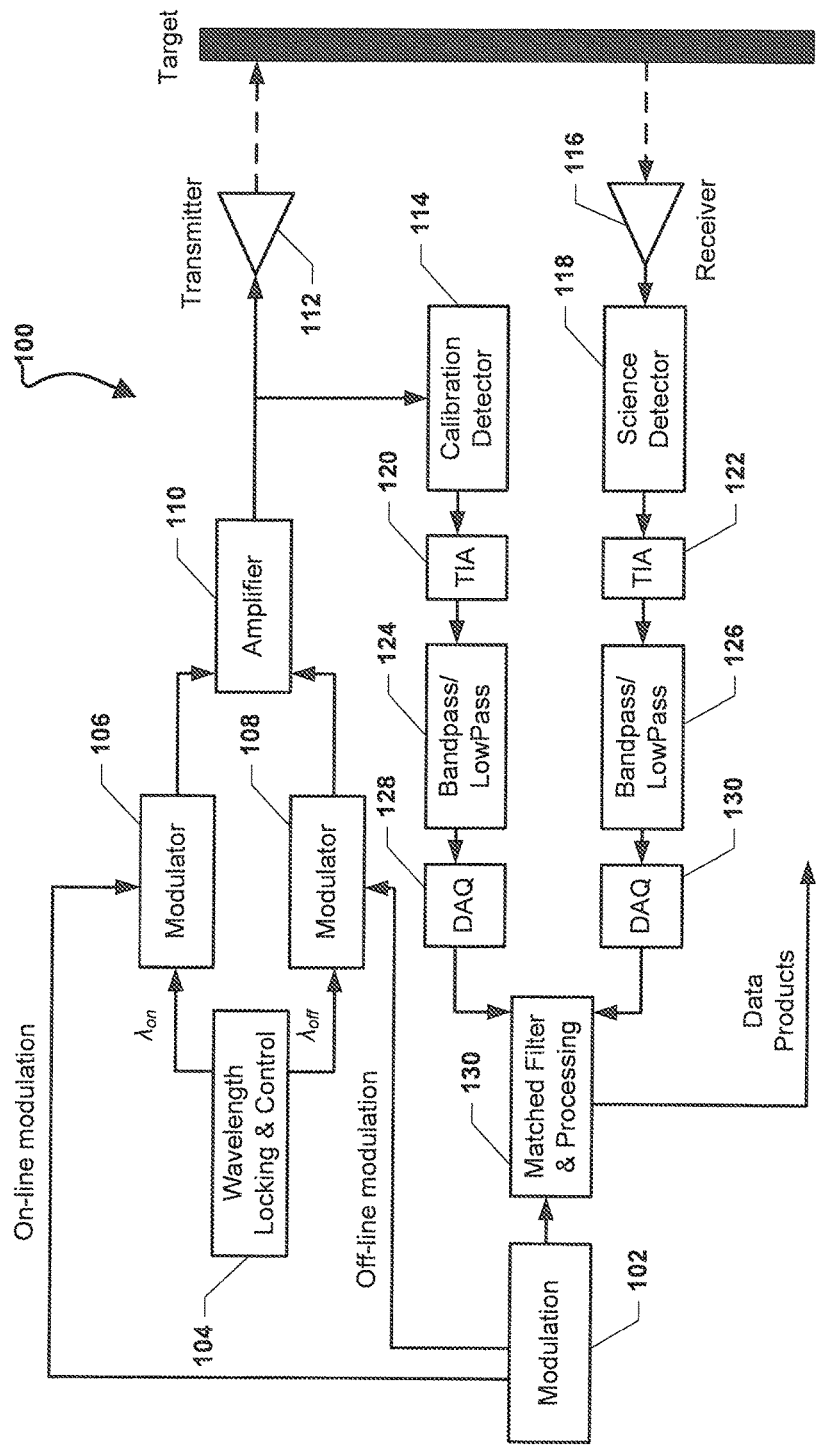
FIG. 1 is system block diagram of an example system (e.g., a CW Lidar, a Radar, or a Sonar system) suitable for use with the various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The systems, methods, and devices of the present invention enable a fast, efficient, and accurate interpolation of Continuous Wave (CW) Light detection and ranging ("Lidar"), Radio detection and ranging ("Radar"), or Sound Navigation and Ranging ("Sonar") data. The systems, methods, and devices of the present invention may enhance the apparent sample rate of data collected using Nyquist sampling from a system, such as CW Lidar, Radar, or Sonar systems, that has been modulated with a repeating waveform, such as linear swept frequency, by reordering of the data in the frequency domain. The enhancement of the apparent sample rate may result in a highly interpolated range profile where the data resolution may be enhanced by a factor equal to the number of repeats in the signal being processed, and may result in a highly detained range measurement with a high precision. The various embodiments may combine data from multiple modulation repeats into a single highly interpolated pulse, which may result in a real-time finer range measurement from CW Lidar, Radar, or Sonar systems.

In the various embodiments, a repeating waveform may form a comb in the frequency domain and the spacing of teeth of the comb may be equal to the number of repeats. By reordering the array such that the spacing of the teeth is 0, and taking the inverse Fourier transform, a repeating pulse may be converted into a single highly interpolated pulse that combines all the information from each individual pulse. The degree of interpolation may be equal to the number of pulses. For example, in a correlation that results in 500 pulses, the result of the embodiment processing may result in a single pulse interpolated 500 times. One unique feature of the processing of the various embodiments is that it may result in a high precision range measurement with a crude sampling system and very little extra processing. Combining multiple pulses into a single highly interpolated pulse according to the various embodiments may also make the single highly interpolated pulse relatively immune to the effects of noise. Additionally, the various embodiments may provide a very simple way to obtain a high precision measurement from a low cost system.

In various CW Lidar, Radar, or Sonar systems a wide band modulation signal is used to modulate the intensity of a narrow linewidth output, which is then amplified and transmitted through the medium (e.g., water or atmosphere) where it reflects off a target, and is received by the receiver of the system. A calibration detector may be used to normalize out any energy fluctuations from the return signal. The digitized received signal is converted into a pulse through a mathematical transformation in the form of a correlation with a complex quadrature reference template stored in a memory of the system. The narrowness of the resulting pulse after the correlation may be inversely proportional to the bandwidth of the modulation. Different types of modulation produce different pulse shapes or autocorrelation functions. One of the simplest modulations is liner swept frequency modulation. One convenient method for determining this correlation is to use the discrete Fourier transform ("DFT") as described above with reference to Equation 1. The various embodiments may improve the precision of these CW Lidar, Radar, or Sonar systems using various types of interpolation.

For simplicity, the linear swept frequency case is discussed herein. However, the discussions of the linear swept frequency case are provided merely as an example to better illustrate aspects of the various embodiments. Other modulations, such as Binary Phase Shift Keying ("BPSK"), may be used with the various embodiments, and other modulations may be substituted in the various examples without departing from the spirit or scope of the invention.

Using the linear swept frequency modulation as an example, the IM signal may be given in Equation 2 as follows:

$$S(t) = \cos(\phi(t)), \quad (2)$$

where $$\phi(t) = 2\pi \left[ f_0 t + \frac{1}{2} \Delta f \tau \, \mathrm{int}\!\left(\frac{t}{\tau}\right) + \frac{\Delta f}{2\tau}(t - \tau \, \mathrm{int}(t/\tau))^2 \right] \quad (3)$$

Here $f_0$ is the start frequency, $\Delta f$ is the sweep bandwidth, and $\tau$ is the sweep period. The complex quadrature reference waveform is:

$$\Gamma(t) = \exp(i\phi(t)). \quad (4)$$

In an embodiment, when either the swept frequency, BPSK, or other similar repeating waveform is correlated with the received signal as in Equation 1, the DFT of the reference template and received signals may be determined.

If the reference template is formed from a repeating number of sweeps, the DFT may form a Kronecker comb where the spacing between the teeth of the comb may be equal to the number of sweeps and the values between the teeth of the comb may be 0. When the DFT of the complex quadrature reference template is multiplied by the DFT of the data, the resulting product may also be a comb, where the values between the teeth of the comb will still be 0. When the inverse DFT is found, the result may be a periodic pulse train. The position of each pulse within its period (or unambiguous range) may determine the range. The spacing between points will be $(c/2s_r)$, where c is the speed of light and $s_r$ is the sample rate.

Given that the DFT of the correlation forms a comb in the case of a repeating waveform and that the spacing between the teeth of the comb may be equal to the number of repeats, if the DFT array elements are reordered such that the spacing between the teeth is 0, a periodic pulse train may be effectively transformed into a highly interpolated single pulse. However, this must be done about a point equal to the center frequency of the spectrum plus the Nyquist rate such that all the teeth to the left of this point are moved to the left and all the teeth to the right of this point are moved to the right. This works because there is no mirror image in the frequency domain and it will therefore only have one unique spectrum since the complex quadrature is used as the reference. The only requirement for this to work is that the signal must be sampled higher than the Nyquist rate. This is accomplished by creating a new array of the same length and setting $$f'(n) = f[n_0 + N_s(n-1)], \; 1 < n \le \frac{N_p}{2} + N_c - 1, \quad (4)$$

$$f'\left(n + N - \frac{N_p}{2}\right) = f\left[N_s\left(n - 1 + \frac{N_p}{2}\right) + n_0\right],$$

$$N_c < n \le \frac{N_p}{2},$$

$$f'(n) = 0, \text{ otherwise.}$$

Here f' is the new spectrum, f is the old spectrum, $n_0$ is the position of the first tooth of the comb, $N_s$ is the number of sweeps/repeats, N is the total number of points, $N_p$ is the number of points in one sweep/repeat, and $N_c$ is the center frequency of the waveform in bins.

Alternatively, a cyclic rotation in the frequency domain such that the center frequency is mapped to 0 may be performed. Then the array may be reordered such that all the teeth left of center are moved to the left and all teeth to the right of center are moved to the right. In this case Equation 4 with $N_c=0$ may be utilized.

Both of the aforementioned methods work—the only difference is the phase term in the resulting correlation, which is removed when the magnitude is taken. The level of interpolation will be equal to the number of repeats in the DFT.

The theoretical explanation for this is the DFT of a function that is periodic within the range of the DFT forms a Kronecker comb. By changing the comb spacing to 0, the resulting inverse Fourier transform becomes non-periodic within the DFT range. Since the values outside of the comb are 0, the embodiment operations perform a type of Fourier interpolation. However, unlike normal Fourier interpolation extra points or 0s are not introduced in the spectral domain. Rather, the various embodiments just reorder the ones that already exist, which makes the embodiment techniques very efficient.

The various embodiments works with any repeating waveform such as linear frequency modulation, non-linear frequency modulation, periodic BPSK, etc. provided they are sampled greater than the Nyquist rate. One interesting application enabled by the various embodiments is a phase correction in the time domain with the complex quadrature correlation. By taking out the resulting phase component with a phase correction the signal to noise ratio ("SNR") may be improved by mapping the signal to the real part while the noise is equally distributed between the real and imaginary parts. By taking the real part of the resulting phase corrected signal half the noise may be eliminated.

In various embodiments, sampling resolution and pulse width can be enhanced further by applying a deconvolution algorithm, such as maximum entropy, Richardson-Lucy ("RL"), etc., to the interpolated data. For example, a Richardson-Lucy deconvolution may be applied to enhance the resolution and pulse width by about two orders of magnitude.

In an embodiment, after determining the magnitude of the resulting interpolated correlation, the correlation may be further enhanced using an accelerated RL algorithm. The basic assumption used by RL is the measured image is given by:

$$\lambda = \psi \otimes \rho + \eta \quad (5)$$

Where $\lambda$ is the measured image, w is the Point Spread Function ("PSF"), $\rho$ is the undistorted image, $\eta$ is the noise, and $\otimes$ is the convolution operator. The RL algorithm estimates the undistorted image iteratively by calculating N iterations of $$\rho_{n+1} = \rho_n\left(\psi \,\hat{\otimes}\, \frac{\lambda}{\psi \otimes \rho_n}\right) \quad (6)$$

Where $\rho_n$ is the nth estimate of the undistorted image and $\hat{\otimes}$ is the correlation operator. Both the PSF and image are assumed to be positive with RL. Because such a high degree of interpolation is being used, the algorithm may be further modified to second order by iterating with a new PSF derived from the original PSF such that N iterations of Equation 7 may be calculated as follows:

$$\psi'_{n+1} = \psi'_n\left(\psi \,\hat{\otimes}\, \frac{\psi}{\psi \otimes \psi'_n}\right) \quad (7)$$

Where $\psi'_0 = \psi$. Then we refine the result further by calculating N' iterations of $$\rho'_{n+1} = \rho'_n\left(\psi'_N \,\hat{\otimes}\, \frac{\rho_N}{\psi'_N \otimes \rho'_n}\right) \quad (8)$$

Where $\rho'_0 = \rho_N$. In this way it may be possible to accelerate convergence by an order of magnitude or more.

The various embodiments may also be applied to pulse Lidar systems. In pulse Lidar systems, the operations described above may be the same, except that rather the doing a fast Fourier Transform ("FFT") correlation and reordering the array elements in the frequency domain, a comb filter may be applied and then the reordering of the array elements in the frequency domain may be applied. Thus, one of ordinary skill in the art will understand that the operations are otherwise the same, the comb filter is merely substituted for FFT correlation.

FIG. 1 is system block diagram of an example system 100 (e.g., a CW Lidar, a Radar, or a Sonar system) suitable for use with the various embodiments. A modulation module 102 may output on-line modulation and off-line modulation to modulators 106 and 108, respectively. The modulation module 102 may also output indications of the modulation used to the matched filter and processing module 130. A wavelength and locking control module 104 may provide signals to the modulators 106 and 108, respectively. In an embodiment, one or more of the modulation module 102, matched filter and processing module 130, and/or wavelength and locking control module 104 may be modules of and/or controlled by a processor of a computing device. A wide band modulation signal may be used to modulate the intensity of a narrow linewidth output, such as a narrow linewidth seed laser. The modulated signal may be amplified by the amplifier 110 and output via the transmitter 112.

The transmitted signal (e.g., light, radio waves, sound, etc.) is reflected off the target and received by the receiver 116 (e.g., telescope, transducer, antenna, etc.) and science detector 118. The signal may also be sent to the calibration detector 114 to normalize out any energy fluctuations (e.g., laser energy fluctuations) from the return signal. A series of transimpedance amplifiers 120, 122, filters 124, 126, and analog to digital converts 128, 130, respectively, digitize the transmitted (i.e., reference signal) sent to the calibration detector 114 and the received signal from the science detector 118 and provide the signals to the matched filter and processing module 130.

The digitized received signal is converted into a pulse through a mathematical transformation in the form of a correlation with a complex quadrature reference kernel stored in memory. The narrowness of the resulting pulse after the correlation is inversely proportional to the bandwidth of the modulation. Different types of modulation produce different pulse shapes or autocorrelation functions.

Figure 2:
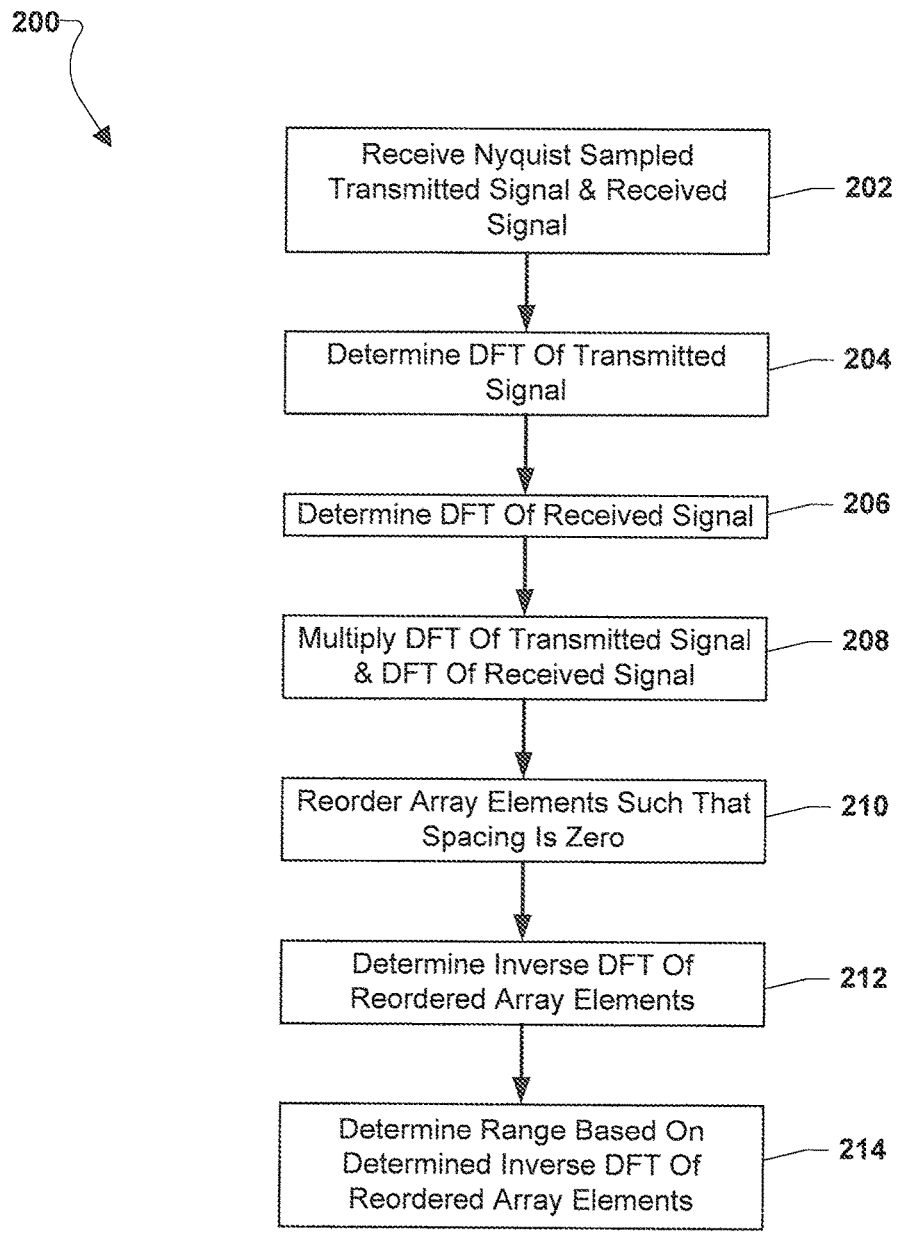
FIG. 2 is a process flow diagram illustrating an embodiment method for reordering of the data in the frequency domain.

In various embodiments, a repeating waveform, such as the swept frequency, BPSK, etc., may be correlated with the received signal and the data reordered in the frequency domain to improve the interpolation. FIG. 2 is a process flow diagram illustrating an embodiment method 200 for reordering of the data in the frequency domain. In an embodiment, the operations of method 200 may be performed by the processor of a computing device, such as a computing device of a Lidar, Radar, or Sonar system.

In block 202 the processor may receive a Nyquist sampled transmitted (or reference) signal and a Nyquist sampled received signal. In block 204 the processor may determine the DFT of the transmitted (or reference) signal. If the reference signal is formed from a repeating number of sweeps, the DFT will form a comb where the spacing between the teeth of the comb will be equal to the number of sweeps. In block 206 the processor may determine the DFT of the received signal. In block 208 the processor may multiply the DFT of the transmitted (or reference) signal and the DFT of the received signal to generate array elements of the combined signals. When the DFT of the transmitted signal is a comb, the resulting product of the combined transmitted signal DFT and received signal DFT will also be a comb.

In block 210 the processor may reorder the array elements such that the spacing is zero. In this manner, a periodic pulse train may be effectively transformed into a highly interpolated single pulse. However, this must be done about a point equal to the center frequency of the spectrum plus the Nyquist rate such that all the teeth to the left of this point are moved to the left and all the teeth to the right of this point are moved to the right. This works because there is no mirror image in the frequency domain and it will therefore only have one unique spectrum since the complex quadrature is used as the reference. The only requirement for this to work is that the signal must be sampled higher than the Nyquist rate. This may be accomplished by creating a new array of the same length and reordering the spectrum according to Equation 4 discussed above. Alternatively, a cyclic rotation in the frequency domain such that the center frequency is mapped to 0 may be performed. Then the array may be reordered such that all the teeth left of center are moved to the left and all teeth to the right of center are moved to the right. In this case Equation 4 with $N_c=0$ may be utilized. Both of the aforementioned methods work—the only difference is the phase term in the resulting correlation, which is removed when the magnitude is taken. The level of interpolation will be equal to the number of repeats in the DFT. In block 212 the processor may determine the inverse DFT of the reordered array elements. In block 214 the processor may determine the range based on the determined inverse DFT of the reordered array elements. The result of correlation after reordering may provides a single pulse that is oversampled by the number of repeats resulting in a better range precision than interpolation without reordering.

FIGS. 3A and 3B are graphs of a frequency spectrum of a correlation before reordering showing spectrum formed as a comb. An example linear sweep case with a 10000 points total for 25 sweeps is shown in FIGS. 3A and 3B. FIG. 3A shows how using the complex quadrature gives only one unique spectrum without a mirror image, thereby extending the Nyquist rate by a factor of 2. This may be one of the many advantages to performing the correlation in quadrature. FIG. 3B shows a blowup of the spectrum showing the spectrum is actually a comb. The tooth spacing in this case is 25 because there are 25 sweeps.

FIGS. 4A and 4B are graphs of the frequency spectrum of FIGS. 3A and 3B after reordering with comb tooth spacing reordered to zero. FIG. 4A shows the spectrum after reordering with a comb tooth spacing of 0 and FIG. 4B is a blowup of the spectrum, which shows a more continuous curve. The change in the narrowness of the apparent spectrum is due to the change in the apparent sample rate caused by the reordering process, which in this case has increased the apparent sample rate by a factor of 25.

Figures 5A, 5B:
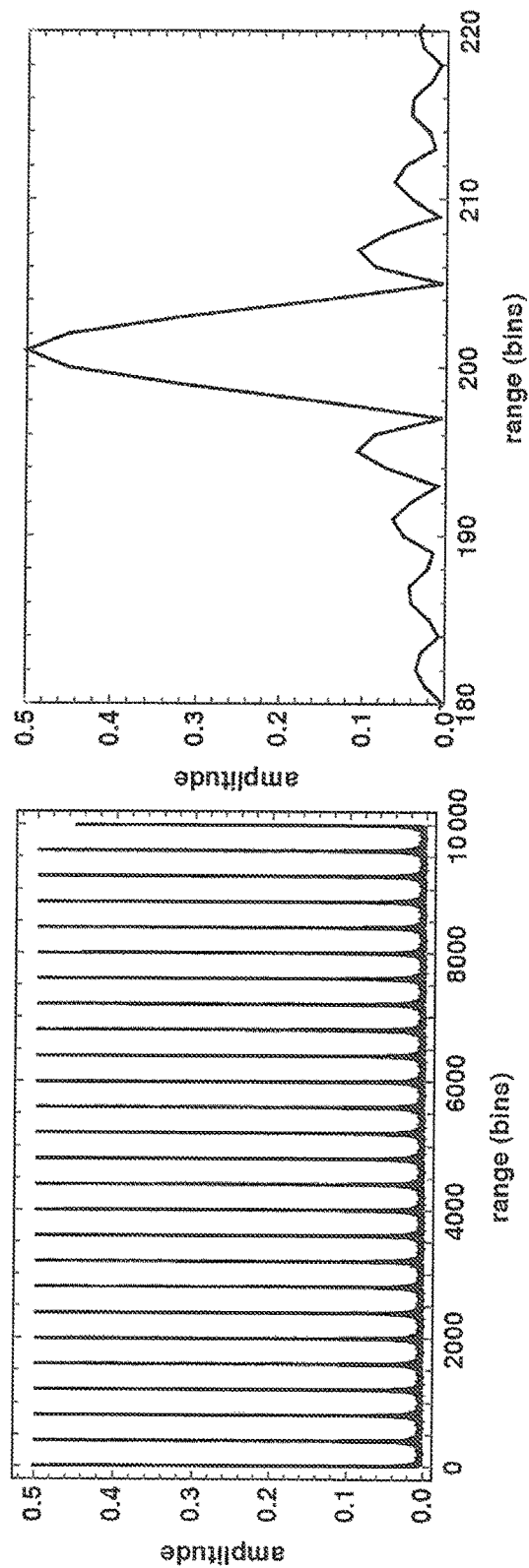
FIGS. 5A and 5B are graphs of a correlation of the frequency spectrum of FIGS. 3A and 3B before reordering showing a periodic pulse profile with crude sampling.

FIGS. 5A and 5B are graphs of a correlation of the frequency spectrum of FIGS. 3A and 3B before reordering showing a periodic pulse profile with crude sampling. FIG. 5A shows the resulting correlation, and FIG. 5B is a detailed blow up of a pulse of FIG. 5A showing the crude sampling of each pulse.

FIGS. 6A and 6B are graphs of a correlation of the frequency spectrum of FIGS. 4A and 4B after reordering showing s periodic pulse converted into a single pulse that is oversampled by the number of repeats. FIG. 6A illustrates that a single pulse is created. The detailed view of the pulse in FIG. 6B exhibits the fine sampling resulting from a factor of 25 improvement in the apparent sample rate. This results in better precisions, that is each range bin represents 1/25 of the range shown in FIGS. 5A and 5B.

Flight Test Results Part I

Figures 7A, 7B:
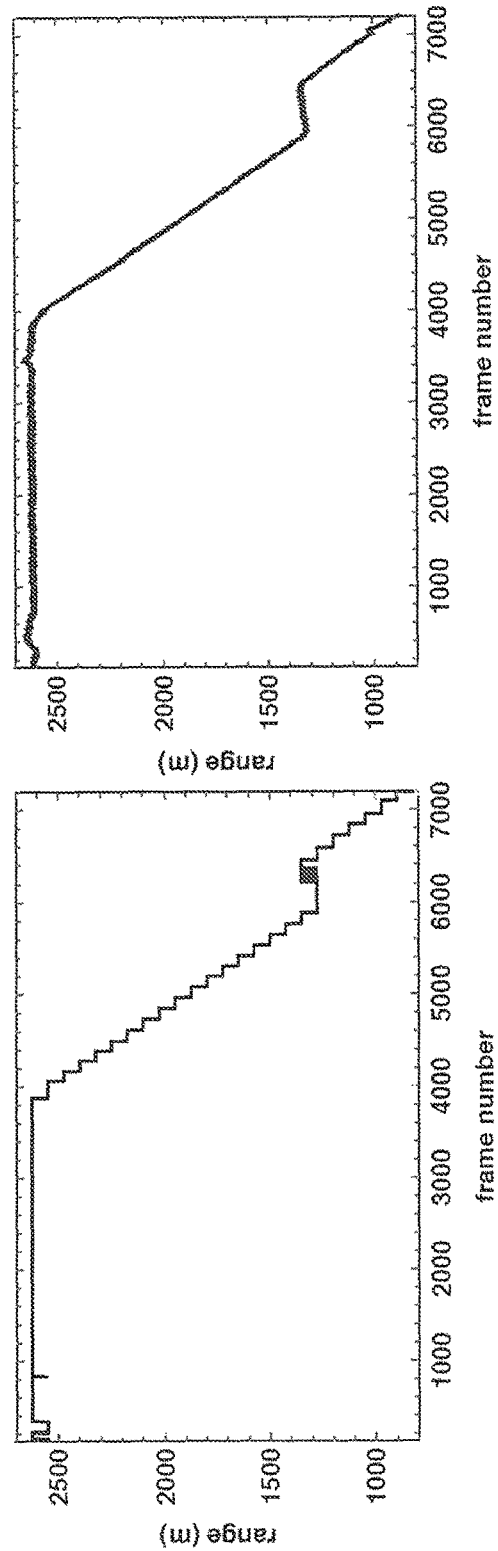
FIGS. 7A and 7B are graphs of range plots from an aircraft descent before and after DFT reordering, respectively.

The embodiment algorithm was recently tested during a series of test flights for a newly developed IM-CW lidar system known as the ASCENDS CarbonHawk Experiment Simulator (ACES). The demonstration of the presented interpolation method was carried out in an ideal situation where the instrument was operated at low power (~1 W avg. power) and low altitude (~2.6 km). Three orthogonal waveforms were transmitted at three different wavelengths (1 absorbing and 2 non absorbing wavelengths in the 1.571 μm CO2 absorption band) where each transmitted wavelength exhibited approximately 0.38 W, 0.35 W, and 0.27 W, respectively of average power. The primary offline wavelength channel, which had an average laser power of approximately 0.35 W was used to derive the range in this example. The test flights were used to experiment with other high fidelity modulation schemes, such as BPSK, but the data used for this discussion utilized 200,000 point linear swept sine waves with 500 kHz bandwidth and 500 sweeps. With a sampling rate of 2 MHz, the fundamental range resolution without interpolation was limited to 75 m. Using the embodiment interpolation technique described herein, with 500 repeats the theoretical sampling resolution will be 75/500=0.15 meters—the equivalent of a 1 GHz sample rate. To show the dramatic improvement of range precision FIGS. 7A and 7B plot the range retrieved from the Lidar system during a descending flight path before and after DFT reordering. FIG. 7A is the estimated range before reordering and FIG. 7B is the range after reordering. This was obtained by finding the position of the maximum of the peak of the correlation. The 75 m resolution step in the retrieved range is eliminated and small scale changes in the range to the surface can be resolved. When the correlation peak is sampled to a finer resolution the resulting range will be known to a greater precision. In the case shown here where a single 350 mW channel was used to derive the range the standard deviation was about 0.75 m as measured over the flattest part of the curve. Higher power laser cases or using all channels may improve this depending on the surface, altitude, and other parameters.

In addition to the embodiment interpolation technique described above, resolution may be further enhanced by applying a non-linear deconvolution algorithm, such as maximum entropy, RL, etc. For example, it may also be useful to do cloud and tree canopy studies with the IM-CW lidar system described above, thereby extracting the maximum possible information from the same system. However, the ability to distinguish two closely spaced objects is determined by the pulse width, which in the IM-CW lidar system described above is the half height width of 352 m, whereas typical tree heights are around 1/10 of this or less, depending on the species. Thus, further processing may be required to enhance the resolution enough to distinguish two pulse that may be closer than they are wide, as may be the case with tree canopy studies. To enhance the resolution further, the spectral domain reordering operations described above may first be applied, and then a non-linear deconvolution may be applied to the result.

Figure 8:
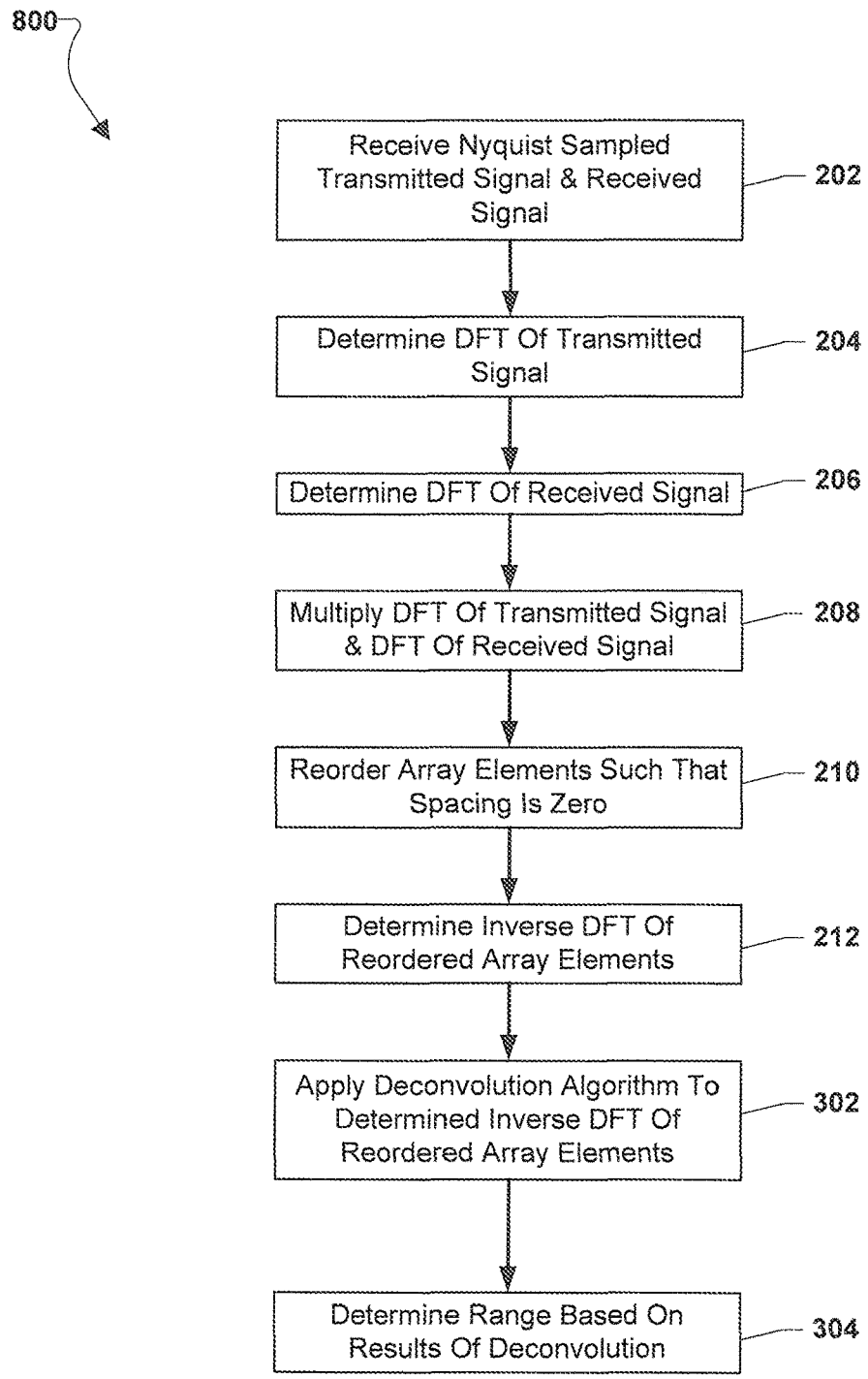
FIG. 8 is a process flow diagram illustrating an embodiment method for applying a deconvolution algorithm to data reordered in the frequency domain.

FIG. 8 is a process flow diagram illustrating an embodiment method 800 for applying a deconvolution algorithm to data reordered in the frequency domain. In an embodiment, the operations of method 800 may be performed by the processor of a computing device, such as a computing device of a Lidar, Radar, or Sonar system. As described above, in blocks 202-212 the processor may perform operations of like number blocks of method 200 to determine the inverse DFT of the reordered array elements. In block 302 the processor may apply a deconvolution algorithm to the determined inverse DFT of the reordered array elements. For example, after taking the magnitude of the resulting interpolated correlation the processor may further enhance the resolution using an accelerated RL algorithm. The basic assumption used by RL is the measured image is given by Equation 5. The RL algorithm may estimate the undistorted image iteratively by calculating N iterations of Equation 6. The algorithm may be modified further to second order by iterating with a new PSF derived from the original PSF such that N iterations of Equation 7 are also calculated and refined further according to Equation 8. In this manner, the convergence may be accelerated. In block 304 the processor may determine the range based on the results of the deconvolution.

Figure 9A:
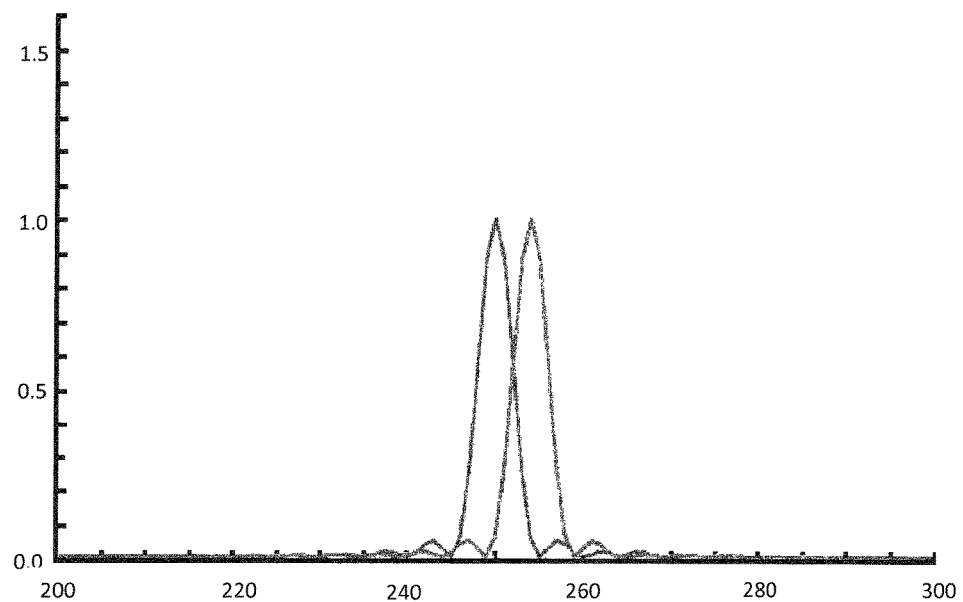
FIG. 9A is a graph of two Lidar pulses.
Figure 9B:
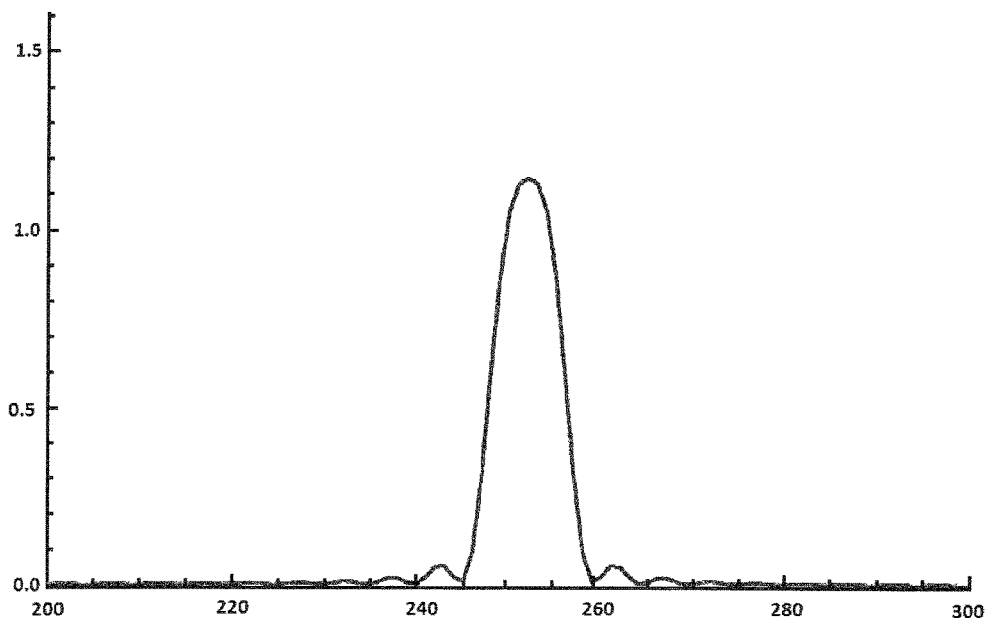
FIG. 9B is a graph of the two Lidar pulses of FIG. 9A added together.
Figure 9C:
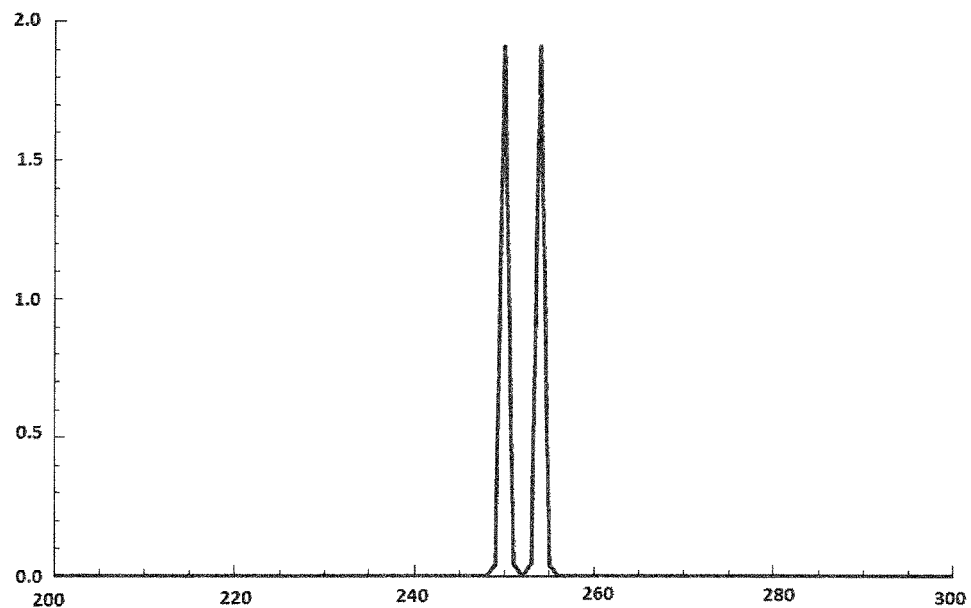
FIG. 9C is a graph of the composite signal of FIG. 9B after deconvolution according to an embodiment.
Figure 9D:
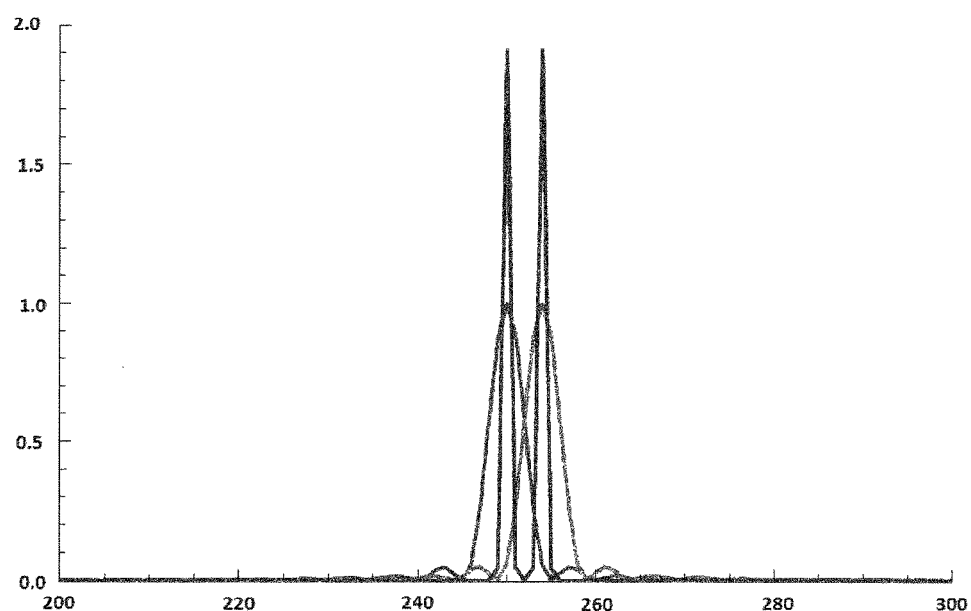
FIG. 9D is a graph comparing the deconvolved signal of FIG. 9C to the original signals of FIG. 9A.

Examples of the embodiment deconvolution using RL are described with reference to FIGS. 9A-12. FIG. 9A is a graph of two Lidar pulses. FIG. 9B is a graph of the two Lidar pulses of FIG. 9A added together. The same two Lidar pulses are added together to form a composite, but each pulse cannot be distinguished due to the fact that they are closer than they are wide. FIG. 9C is a graph of the composite signal of FIG. 9B after deconvolution according to an embodiment. The composite signal is enhanced through the RL deconvolution described above. FIG. 9D is a graph comparing the deconvolved signal of FIG. 9C to the original signals of FIG. 9A. FIG. 9D shows that the predicted centers are accurate and the resolution is greatly enhanced.

Flight Test Results Part II

This accelerated RL algorithm was recently tested during a series of test flights for the IM-CW lidar system known as the ASCENDS CarbonHawk Experiment Simulator (ACES). The demonstration of these concepts was carried out where the instrument was operated at (~10 W avg. total power for three orthogonal transmitted channels) and high altitude (~9-11.5 km). A fourth orthogonal channel was used for noise analysis and was not transmitted. These three orthogonal waveforms were transmitted at three different wavelengths (1 absorbing and 2 non-absorbing wavelengths in the 1.571 μm CO2 absorption band) where each transmitted wavelength exhibited approximately 3.8 W, 3.5 W, and 2.7 W respectively of average power. For the modulation a sample rate of 2 MHz, a code bit rate of 500 kbps, with 400 frame repeats of 203200 points in length was chosen, which gives a sampling resolution of 75 meters and a theoretical pulse resolution of 300 m. Using the Fourier transform reordering described above a periodic 400-peak pulse train was transformed to a single pulse sampled at 75/400=0.1875 m.

Figure 10A:
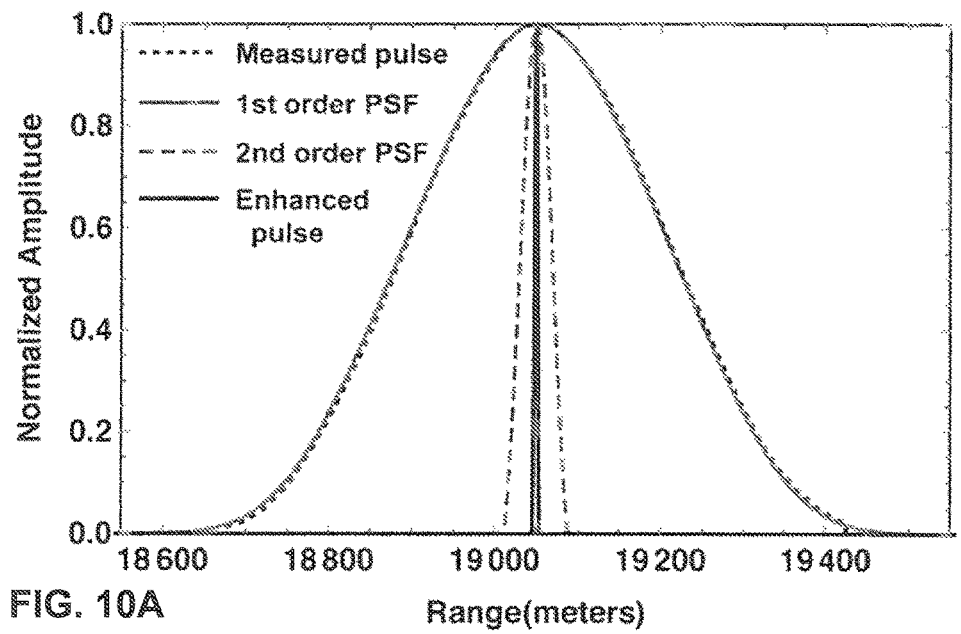
FIGS. 10A and 10B are graphs of the Fourier Transform Reordering interpolation and two stage RL deconvolution according to an embodiment.
Figure 10B:
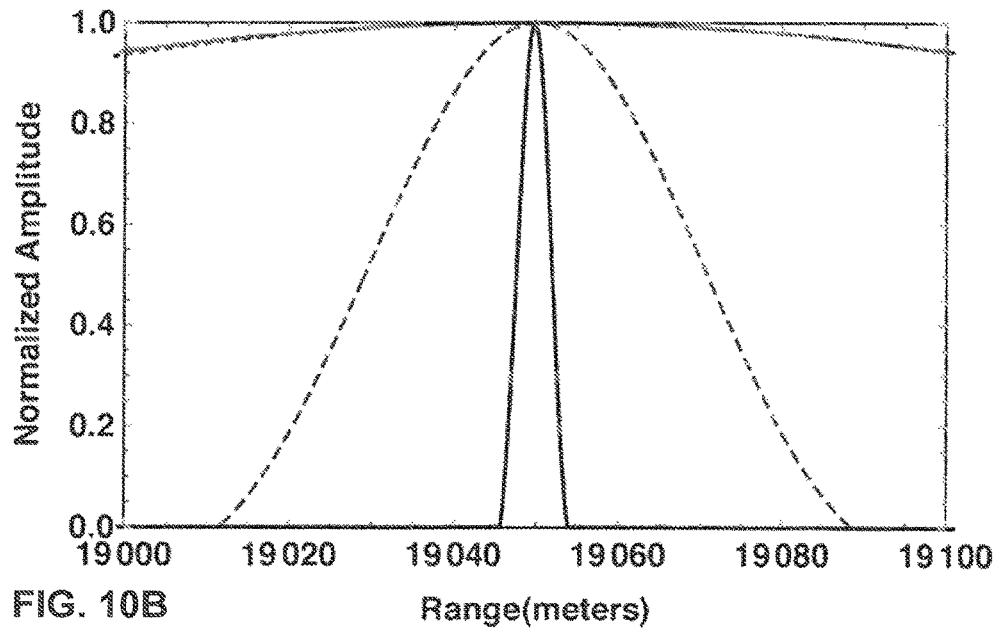

For the first test a ground test was conducted where the laser was fed back to the receiver at close distance at low power. The PSF was obtained by taking the theoretical PN code autocorrelation function, then filtering it with a periodic Gaussian filter. By fine-tuning the amount of filtering to obtain the minimum pulse width from a hard ground return while still being able to see cloud and tree returns, consistent results were able to be obtained. By applying 100 1st order iterations using Equation 6 and Equation 7 described above, then another 30 2nd order iterations using Equation 8, the pulse was transformed from a measured half height width of 352 m to 4.40 m, making the width resolution almost 2 orders of magnitude better as illustrated in FIGS. 10A and 10B. FIGS. 10A and 10B are graphs of the Fourier Transform Reordering interpolation and two stage RL deconvolution according to an embodiment showing the large scale graph and blown up graph, respectively. Data in FIGS. 10A and 10B was centered around 15 km.

Figure 11A:
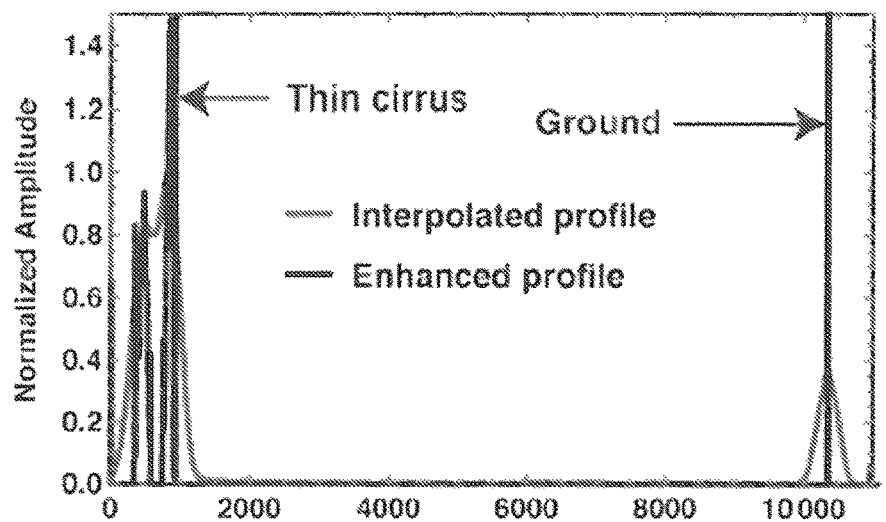
FIGS. 11A-11C are graphs of an interpolated profile and enhanced profile of transmissions through this cirrus clouds according to an embodiment.
Figure 11B:
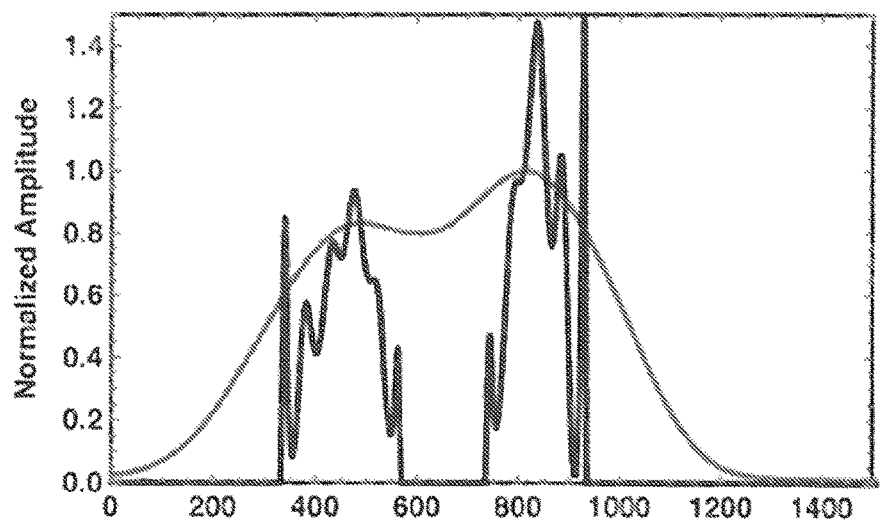
Figure 11C:
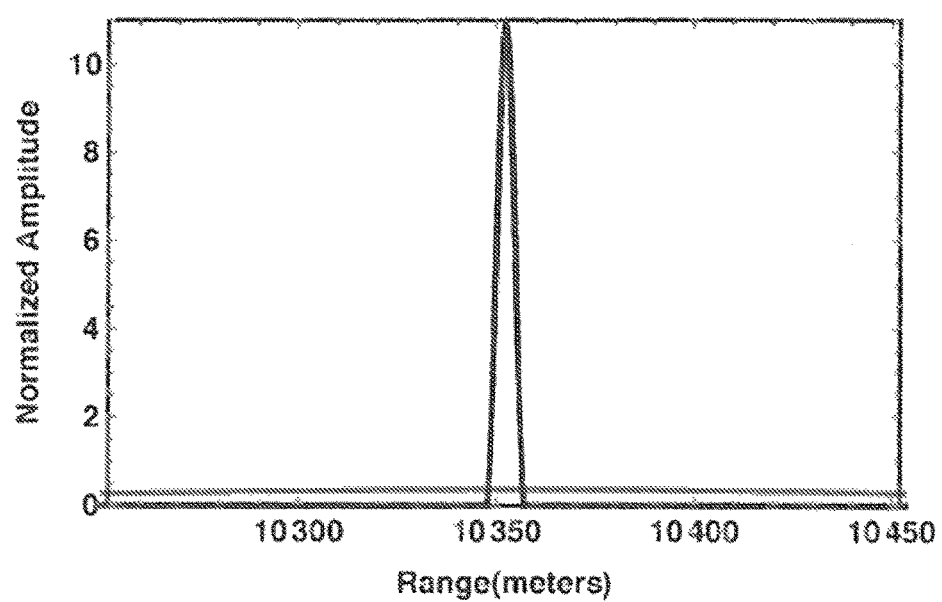

Many flight tests over ocean, land and clouds were conducted. FIGS. 11A-11C show a case where transmissions were made through thin cirrus clouds to a hard surface.

Figure 12:
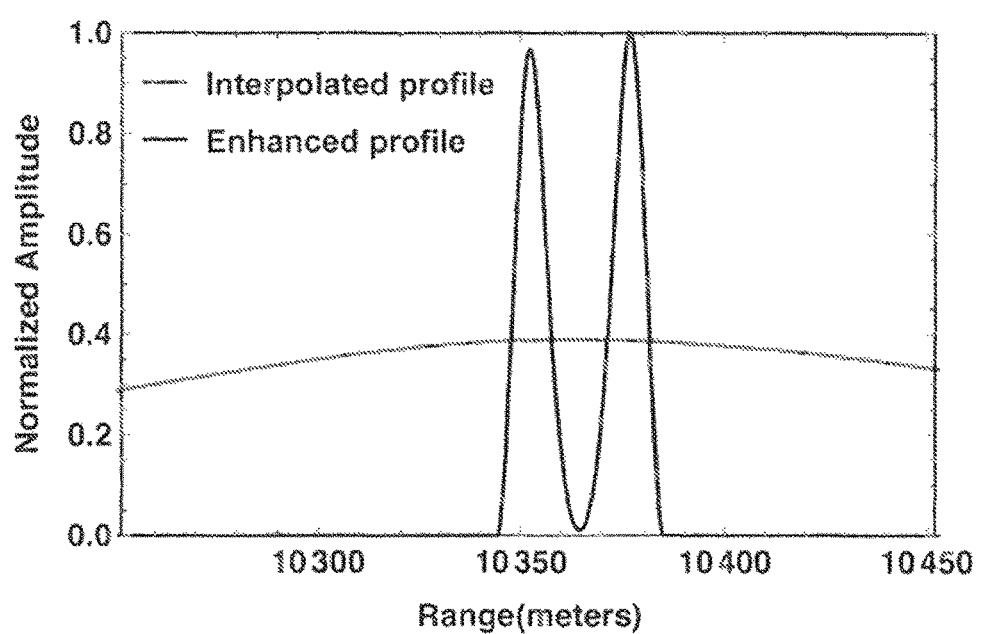
FIG. 12 is a graph of an RL enhanced pulse from tall trees according to an embodiment.

Despite the crude resolution features well below the crude original 75 meter sampling and 352 m pulse width we able to be discerned. One interesting feature is the change in relative pulse height. This can be explained by the algorithms tendency to preserve the area under the pulse. Since the ground pulse received from hard surface is compared to the thickness of the clouds, as one enhances the resolution the ground pulse becomes narrower and taller in comparison to the cloud pulse. The transmission through the thin cirrus clouds is shown in FIG. 11A which show the Fourier transform reordering interpolation combined with RL deconvolution. FIG. 11B shows that the RL enhanced profile is above to detect the thickness of thin cirrus clouds, yet the half height pulse width from the ground is also measured at about 4.91 m. FIG. 11C shows that the half height pulse width of 4.91 m is only slightly wider than the 4.40 m enhanced pulse measured in ground testing. As a comparison a ground return from a Forrest was enhanced, which is shown in FIG. 12. Here a predicted tree height of about 30 m is shown, which is consistent with the type of trees found in southern Virginia.

Various examples of Lidar, Radar, and Sonar are discussed herein, such as differential absorption Lidar. However, the discussions of examples of Lidar, Radar, and Sonar, such as differential absorption Lidar, are provided merely as examples to better illustrate aspects of the various embodiments. Other systems, such as ranging Lidar, may be used with the various embodiments, and other systems may be substituted in the various examples without departing from the spirit or scope of the invention.

Figure 13:
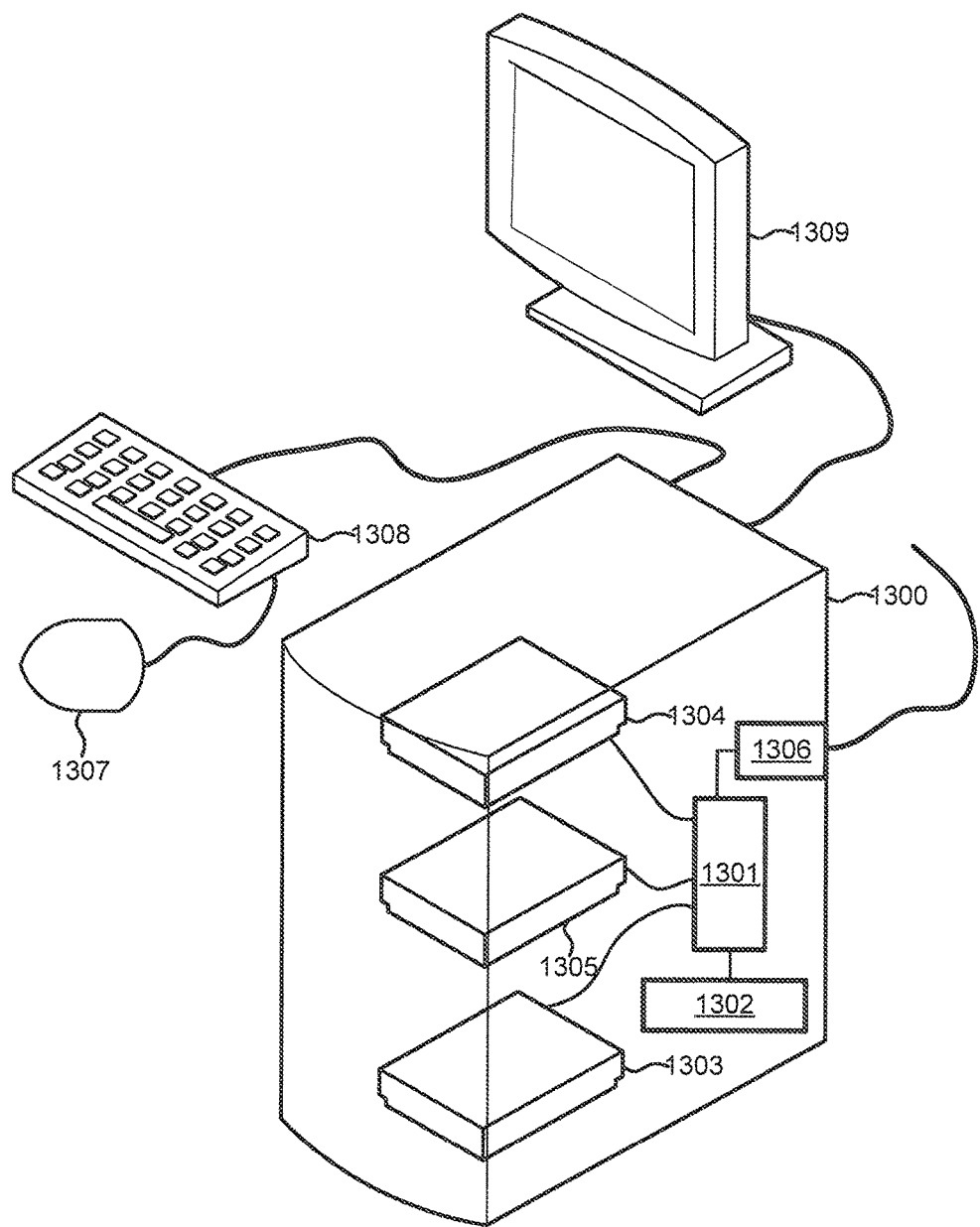
FIG. 13 is a component block diagram of a computing device suitable for use with the various embodiments.

The various embodiments may be implemented in any of a variety of computing devices, an example of which is illustrated in FIG. 13. A computing device 1300 will typically include a processor 1301 coupled to volatile memory 1302 and a large capacity nonvolatile memory, such as a disk drive 1305 of Flash memory. The computing device 1300 may also include a floppy disc drive 1303 and a compact disc (CD) drive 1304 coupled to the processor 1301. The computing device 1300 may also include a number of connector ports 1306 coupled to the processor 1301 for establishing data connections or receiving external memory devices, such as a USB or FireWire® connector sockets, or other network connection circuits for coupling the processor 1301 to a network or bus. The computing device 1300 may also include the trackball 1307, keyboard 1308 and display 1309 all coupled to the processor 1301.

The processor 1301 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1302 and/or 1305 before they are accessed and loaded into the processor 1301. The processor 1301 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1301 including internal memory or removable memory plugged into the device and memory within the processor 1301 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method, comprising:
    sampling a reference signal and a received signal at a sample rate greater than or equal to the Nyquist rate;
    determining, at a processor, a discrete Fourier transform ("DFT") of the reference signal;
    determining, at the processor, a DFT of the received signal;
    multiplying, at the processor, the DFT of the reference signal and the DFT of the received signal to generate array elements of the combined signals;
    reordering, at the processor, the array elements;
    determining, at the processor, an inverse DFT of the reordered array elements; and
    determining, at the processor, a range to a target with a resolution having units of distance less than speed of light÷(2*sample rate) by identifying a pulses in the inverse DFT of the reordered array elements and determining the range based on a position of the pulse in the inverse DFT of the reordered array elements.

2. The method of claim 1, wherein reordering, at the processor, the array elements comprises reordering, at the processor, the array elements such that the spacing between teeth of the array elements is zero.

3. The method of claim 2, wherein a center frequency of the reordered array elements is a center frequency of a waveform of the combined signal in bins.

4. The method of claim 2, wherein a center frequency of the reordered array elements is mapped to zero.

5. The method of claim 1, wherein the reference signal is a modulated signal.

6. The method of claim 5, wherein the modulated signal is one of a linear swept frequency or Binary Phase Shift Keying modulation.

7. The method of claim 1, further comprising applying, at the processor, a deconvolution algorithm to the inverse DFT of the reordered array elements,
    wherein determining, at the processor, a range to a target based at least in part on the inverse DFT of the reordered array elements comprises determining, at the processor, a range to a target based at least in part on the deconvolution.

8. The method of claim 7, wherein the deconvolution algorithm is an accelerated Richardson-Lucy algorithm.

9. The method of claim 1, wherein: the reference signal includes a periodic repeating signal, and reordering causes data points from N periods of the periodic repeating signal to be combined into a single period in the inverse DFT of the reordered array elements;
    N>1; and
    the determining of the range to a target, determines the range with a resolution having units of distance less than (speed of light÷(2*sample rate)/N).

10. An apparatus, comprising:
    a ranging system, wherein the ranging system samples a reference signal and a received signal at a sample rate greater than or equal to the Nyquist rate; and
    a computing device communicatively connected to the ranging system, wherein the computing device is configured and arranged to perform operations comprising:
        determining a discrete Fourier transform ("DFT") of the reference signal;
        determining a DFT of the received signal;
        multiplying the DFT of the reference signal and the DFT of the received signal to generate array elements of the combined signals;
        reordering the array elements;
        determining an inverse DFT of the reordered array elements; and
        determining a range to a target with a resolution having units of distance less than speed of light÷(2*sample rate) by identifying a pulses in the inverse DFT of the reordered array elements and determining the range based on a position of the pulse in the inverse DFT of the reordered array elements.

11. The apparatus of claim 10, wherein a processor is configured with processor executable instructions to perform operations such that reordering the array elements comprises reordering the array elements such that the spacing between teeth of the array elements is zero.

12. The apparatus of claim 11, wherein a center frequency of the reordered array elements is a center frequency of a waveform of the combined signal in bins.

13. The apparatus of claim 11, wherein a center frequency of the reordered array elements is mapped to zero.

14. The apparatus of claim 10, wherein the sampled reference signal is a modulated signal.

15. The apparatus of claim 14, wherein the modulated signal is one of a linear swept frequency or Binary Phase Shift Keying modulation.

16. The apparatus of claim 10, wherein:
    the processor is configured with processor executable instructions to perform operations further comprising applying a deconvolution algorithm to the inverse DFT of the reordered array elements; and
    the processor is configured with processor executable instructions to perform operations such that determining a range to a target based at least in part on the inverse DET of the reordered array elements comprises determining a range to a target based at least in part on the deconvolution.

17. The apparatus of claim 16, wherein the deconvolution algorithm is an accelerated Richardson-Lucy algorithm.

18. The apparatus of claim 10, wherein the ranging system is a Lidar system, Radar system, or Sonar system.

19. An apparatus, comprising:
    a first circuit configured to sample a reference signal and a received signal at a first sample rate that is greater than or equal to the Nyquist rate; and
    a second circuit communicatively connected to the first circuit, wherein the second circuit is configured and arranged to perform operations comprising:

determining a discrete Fourier transform ("DFT") of the reference signal;

determining a DFT of the received signal;

multiplying the DFT of the reference signal and the DFT of the received signal to generate array elements of the combined signals;

reordering the array elements;

determining an inverse DFT of the reordered array elements to produce a set of samples having a second sample rate greater than the first sample rate;

determining the range based on a position of the pulse in the inverse DFT of the reordered array elements; and wherein the second circuit is further configured and arranged to determine a range to a target with a resolution having units of distance less than speed of light÷(2*sample rate) by identifying a pulses in the inverse DFT of the reordered array elements and determining the range based on a position of the pulse in the inverse DFT of the reordered array elements.

* * * * *